US006452351B1

(12) United States Patent
Hopson et al.

(10) Patent No.: US 6,452,351 B1
(45) Date of Patent: Sep. 17, 2002

(54) METHOD AND SYSTEM FOR DETECTING AN OBJECT CAUGHT IN THE PATH OF AN AUTOMOTIVE WINDOW USING A PIEZOELECTRIC TORQUE SENSING DEVICE

(75) Inventors: Charles Hopson, Lebanon, TN (US); Timothy Davies, Hermitage, TN (US); Joseph Tyckowski, Clawson, MI (US); Christos Kyrtsos, Southfield, MI (US); Francois Breynaert, Caen (FR); Pascal Bonduel, Bouzy la Foret (FR)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 09/391,298

(22) Filed: Sep. 7, 1999

(Under 37 CFR 1.47)

(51) Int. Cl.[7] ........................ H02P 7/00

(52) U.S. Cl. ........................ 318/432; 318/434; 318/280; 310/316; 73/862.23; 74/425

(58) Field of Search ........................ 318/65, 466, 54, 318/468, 280, 432, 434; 74/425, 337; 49/26, 28; 310/314, 316; 73/862.23, 862.325

(56) References Cited

U.S. PATENT DOCUMENTS

| | | | | | |
|---|---|---|---|---|---|
| 4,361,308 | A | * | 11/1982 | Buss | 251/134 |
| 4,641,067 | A | * | 3/1987 | Lizawa et al. | 318/287 |
| 4,805,463 | A | * | 2/1989 | Kelledes et al. | 336/30 |
| 5,363,713 | A | * | 11/1994 | Pearson | 74/425 |
| 5,780,751 | A | * | 7/1998 | Nomerange et al. | 73/862.321 |
| 5,811,695 | A | * | 9/1998 | Satoh et al. | 73/862.331 |
| 5,821,669 | A | * | 10/1998 | Shin | 310/323 |
| 6,015,514 | A | * | 1/2000 | Koseko | 264/40.1 |
| 6,079,442 | A | * | 6/2000 | Raymind, Jr. et al. | 137/554 |

* cited by examiner

*Primary Examiner*—Robert E. Nappi
*Assistant Examiner*—Rita Leykin
(74) *Attorney, Agent, or Firm*—Carlson, Gaskey & Olds

(57) ABSTRACT

A method and system for detecting the presence of an object caught between an automotive window and its respective frame includes a sensor mounted on a drive motor that drives a regulator to move the window upward and downward. The sensor senses a resistive torque applied against the regulator and generates a signal having a value proportional to the amount of resistive torque sensed. The signal is transmitted to a control circuit which then determines whether or not an object is caught between the window and its respective frame.

20 Claims, 2 Drawing Sheets

METHOD AND SYSTEM FOR DETECTING AN OBJECT CAUGHT IN THE PATH OF AN AUTOMOTIVE WINDOW USING A PIEZOELECTRIC TORQUE SENSING DEVICE

BACKGROUND OF THE INVENTION

The invention relates to a method and system for detecting an object caught in the path of an automotive window.

Many of the automotive vehicles today have electronically controlled windows and may even have electronically controlled sun/moon roofs. These systems provide the operator with ease in opening and closing the windows. However, if the operator is distracted while closing the window, it is possible for an object, such as an arm, hand or finger, to be caught between the window and the window frame of the automotive window.

A power window system consists of a regulator coupled to the window and driven by an electric drive motor. The motor typically comprises an output shaft connected to a worm associated with a gear wheel. The gear wheel is connected to an output member coupled to the regulator. Thus, as the motor rotates, the worm rotates, causing the gear wheel to also rotate. Rotation of the gear wheel results in the regulator being driven upward and downward.

One known technique for sensing/detecting the presence of an object caught between a window and its frame when the window is closed utilizes an elastically deformable damper coupled between the gear wheel and the output member. The elastically deformable member permits angular displacement between the wheel and the output member in response to a resistive torque being applied to the output member. The angular displacement is then sensed using a pair of angular position encoders, wherein one encoder is associated with the gear wheel and the other encoder is associated with the output member. If an object is present, a resistive torque is applied to the output member causing the damper to deform and generating an angular displacement between the output member and the gear wheel. This technique, however, has several challenging technical issues concerning the dampers. As examples, the elastic compliance must provide linearity throughout the entire range of torque, the elastic compliance must allow angular displacements large enough to be detected by the encoders, and the elastic stiffness changes as the damper ages.

Thus, there exists a need for a torque sensing device for sensing a torque associated with a resistive force applied to a power window that overcomes the problems encountered by the prior art.

SUMMARY OF THE INVENTION

A system for detecting the presence of an object caught between an automotive window and its respective frame is disclosed. The window is mounted on a regulator that is driven upward and downward by an electric drive motor controlled by a control circuit. A sensor is mounted on the drive motor for sensing a resistive torque applied to the regulator. The sensor generates a voltage signal having a value proportional to the sensed resistive torque.

A rotor shaft extends from the drive motor and has a cylindrical worm sleeve encircling it. The worm sleeve is formed with grooves. A grooved gear wheel is associated with the sleeve, and rotates in response to rotation of the worm sleeve. An output member extends from the gear wheel and is coupled to the regulator for moving the window upward and downward. A sensor comprises a piezoelectric layer mounted on the rotor shaft so that it is sandwiched between the worm sleeve and the rotor shaft when the worm sleeve is inserted onto the rotor shaft. The piezoelectric layer senses a pressure in response to the resistive torque being applied to the worm sleeve via the regulator.

Some rotating electric coupling transmits a signal from the piezoelectric layer to a control. In one embodiment, a pair of secondary brushes are mounted on a secondary commutator to transmit the voltage signal generated by the piezoelectric layer. The signal is received by a corresponding pair of secondary contacts connected to the control circuit. The control circuit determines whether or not an object is caught between the window and its respective frame based on the voltage signal. If an object is present, the value of the voltage signal exceeds a predetermined value. In response to this determination, the control circuit either stops or reverses the direction of the drive motor. Other rotating electric couplings may be used.

These and other features of the present invention can be understood from the following specification and drawings.

DETAILED DESCRIPTION OF A PREFERRED EMBODIMENT

Figure 1:
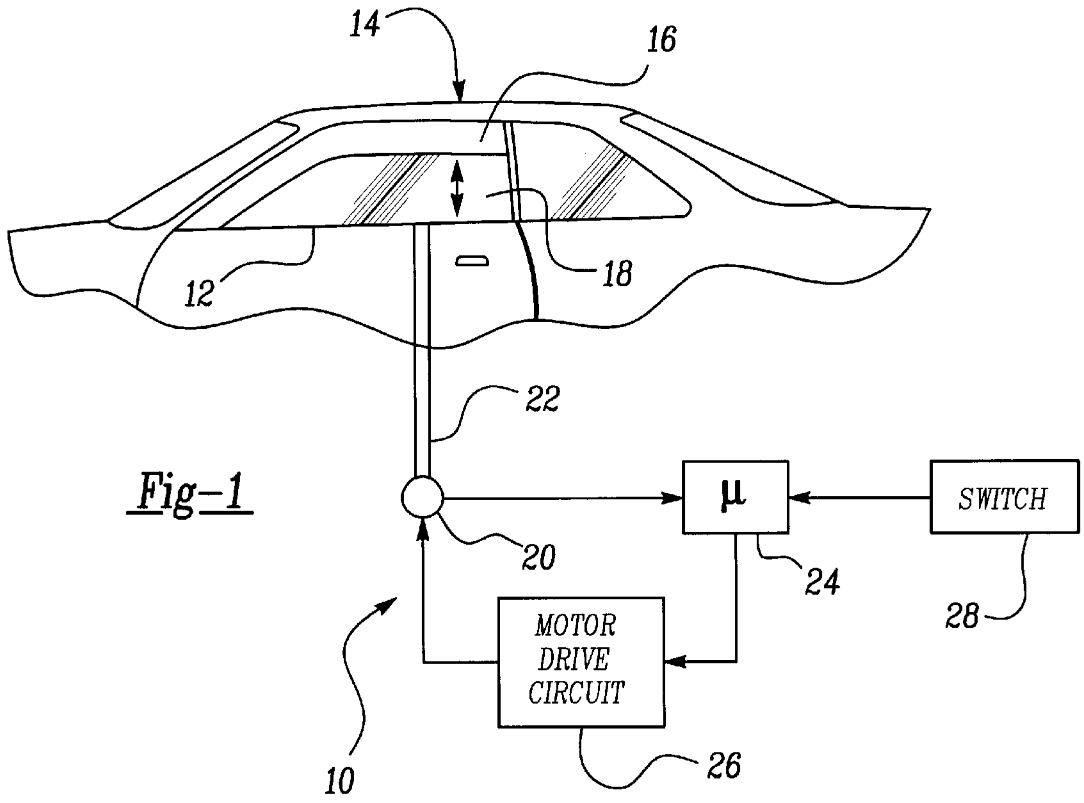
FIG. 1 is a schematic block diagram of a power window system incorporating the torque-sensing device of the present invention.

FIG. 1 shows a power window system 10 incorporating the torque-sensing device of the present invention. An automotive vehicle has a door 12 and a window frame 14 defining a window opening 16. While a side window is shown, the term "window" as used in this application also extends to rear windows, moon roofs, sun roofs, or other vehicle closure components.

The door 12 is equipped with a window glass 18 movable elevationally within the window opening 16 and a drive motor 20 linked with a regulator 22 for driving the window glass 18 upward and downward. Microprocessor, or control circuit, 24 controls the drive motor 20 via motor drive circuit 26 in response to signals from switch 28 that commands upward/downward movement of the window glass 18.

Figure 2:
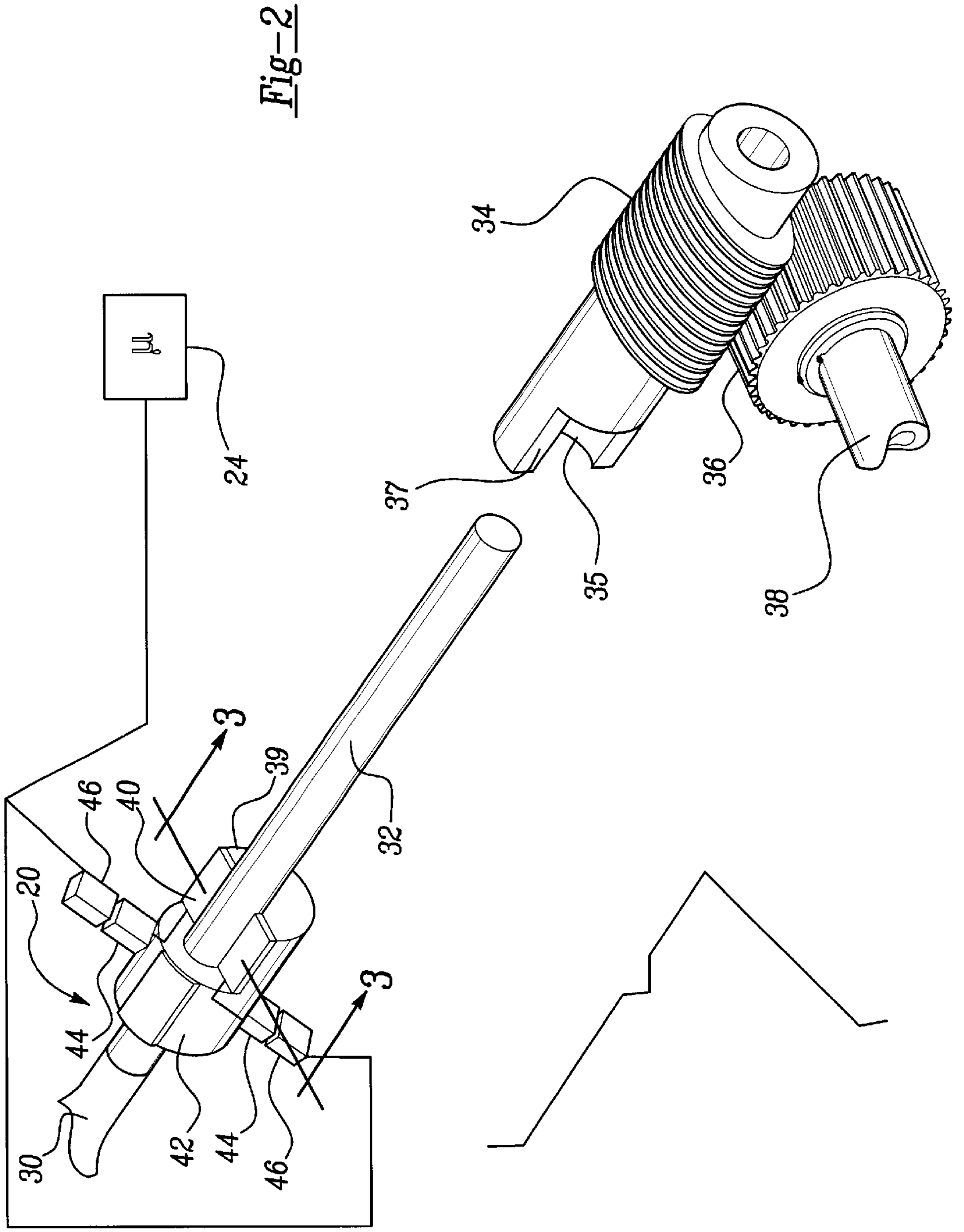
FIG. 2 is a perspective partial view of the torque-sensing device of the present invention.

Turning now to FIG. 2, there is shown a perspective partial view of the torque-sensing device of the present invention. The device is incorporated into the drive motor, denoted generally by 20. Drive motor 20 includes a motor portion 30 consisting of typical components (not shown), such as permanent magnets, commutator brush, etc. The drive motor 20 further includes an output rotor shaft 32 and a cylindrical worm sleeve 34 that is slidably mounted onto shaft 32. Worm sleeve 34, thus, rotates as rotor shaft 32 rotates causing gear wheel 36 to also rotate. Gear wheel 36 has an output member 38 that further rotates as gear wheel 36 rotates. Output member 38 is coupled to regulator 22 so that as output member 38 rotates, regulator 22 moves upward and downward accordingly. The structure of gear wheel 36 and output member 28 is shown somewhat schematically.

In order to sense any resistive force/torque applied to the regulator 22 due to an obstruction between the window 18 and frame 14, a piezoelectric layer 40 is mounted on an end face of a hub portion 39 of the rotor 32 that comes in contact with a surface of the worm sleeve 34 so that it is sandwiched therebetween. Thus, as the torque resisting rotation of worm sleeve 34 changes, this changing torque is sensed via a proportional voltage signal generated by piezoelectric layer 40.

The rotor shaft is formed with a semicircular hub portion 39 having outer end faces that receive the piezoelectric layer 40. Worm sleeve 34 has a bore 35 received on shaft 32. A hub portion 37 of the worm sleeve 34 has outer end faces that face the outer end faces of hub portion 39. The piezoelectric layer 40 is thus caught between the end faces.

Figure 3:
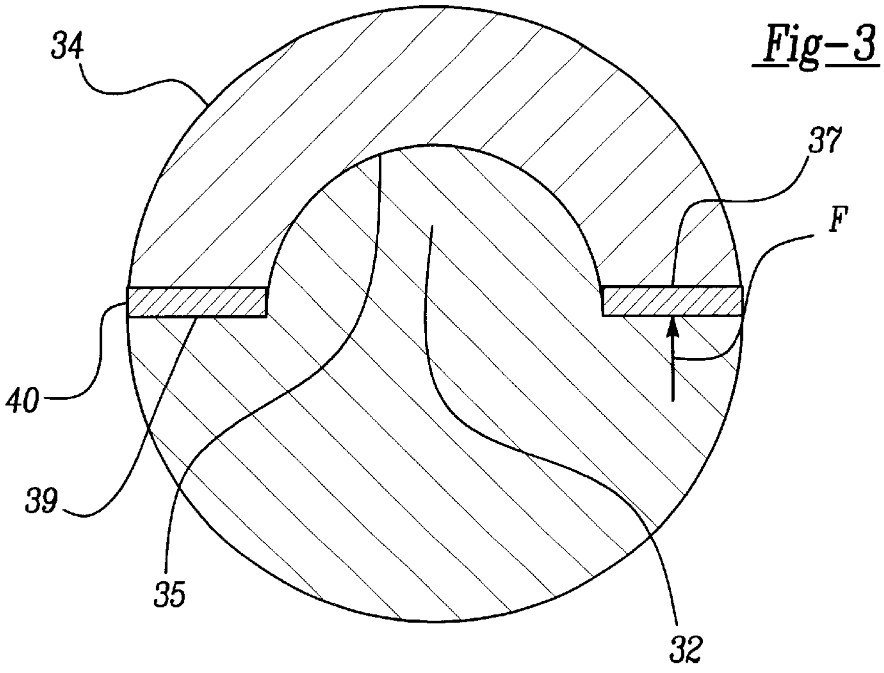
FIG. 3 shows forces on the inventive sensor.

As shown in FIG. 3, when shaft 32 is turned by motor 30, sleeve 34 is turned Sleeve 34 can be fixed to be driven by shaft 32, such as by splines. When sleeve 34 is driven, a resistance torque force F is transmitted back to the shaft 32. The piezoelectric 40 senses the magnitude of the force F. If an obstruction is in the way of the window, the resistance torque increases, and force F increases.

The voltage generated by the piezoelectric layer 40 is sensed via a secondary commutator/brush assembly 42 included in the drive motor 20. The secondary commutator 42 has a pair of brushes 44 that are electrically connected to piezoelectric layer 40. The secondary brushes 44 rotatably come into contact with secondary contacts 46 that transmit the signal from the piezoelectric layer 40 to the control circuit 24. Other rotating electrical coupling may be used.

In operation, the drive motor rotates according to control signals generated by control circuit 24 in response to switch 28. If no resistive torque is applied to the output member 38 via the regulator 22, then the worm sleeve 34 is not pressured against piezoelectric layer 40 and rotor shaft 32. On the other hand, if a resistive torque is applied to the output member 38, the worm sleeve 34 is pressured against the rotor shaft 32. Piezoelectric layer 40 senses this pressure and generates a voltage signal for receipt by brushes 44, which in turn transmit this signal to the control circuit 24 via the contact members 46. This voltage is compared to a reference voltage. A particular voltage level is associated with an indication an obstruction is in the path of the window. If control 24 senses that this level is pass, then control circuit 24 commands the drive motor 20 to either stop or reverse its direction.

Preferred embodiments have been disclosed. However, a worker in this art would recognize that modifications would come within the scope of this invention. Thus, the following claims should be studied to determine the scope and content of this invention

What is claimed is:

1. A method for detecting the presence of an object caught between an automotive window and its respective frame comprising:

providing a window opening and closing via a regulator driven by an electric drive motor controlled by a control circuit, the electric drive motor including a rotor shaft and a cooperating worm sleeve, the worm sleeve having a gear wheel associated therewith and an output member coupled to the regulator;

directly sensing a resistive torque applied to the worm sleeve via the regulator and generating a signal having a value proportional to the resistive torque;

transmitting the signal to the control circuit; and detecting an object caught between the window and its respective frame based on the signal.

2. The method as recited in claim 1 wherein detecting the object comprises comparing the signal to a predetermined value.

3. The method as recited in claim 1 further comprising controlling the drive motor in response to detecting the object.

4. The method as recited in claim 3 wherein controlling the drive motor comprises stopping the drive motor.

5. The method as recited in claim 3 wherein controlling the drive motor comprises reversing the drive motor so as to open the window.

6. The method as set forth in claim 1, wherein said sensing of resistive torque is performed by a torque sensor for sensing the torque actually applied to said worm sleeve.

7. A window system comprising:

an automotive window opening and closing via a regulator driven by an electric drive motor;

a sensor mounted on the drive motor for directly sensing a resistive torque applied to the regulator and generating a signal having a value indicative of the resistive torque;

a connection for transmitting the signal to a control; and a control circuit in communication with the connection and the drive motor for receiving the signal and determining whether or not an object is caught between the window and a frame based on the signal.

8. The system as recited in claim 7 wherein the control circuit is further operative to control the drive motor in response to detecting the object.

9. The system as recited in claim 8 wherein the control circuit, in controlling the drive motor, is further operative to stop the drive motor.

10. The system as recited in claim 8 wherein the control circuit, in controlling the drive motor, is further operative to reverse the drive motor so as to open the window.

11. The system as recited in claim 7 wherein the control circuit, in determining whether or not an object is caught, is further operative to compare the value of the signal with a predetermined value.

12. The system as recited in claim 7 wherein the drive motor includes a rotor shaft extending therefrom, a cylindrical worm sleeve encircling the rotor shaft, a gear wheel associated with the worm sleeve for rotating in response to rotation of the worm sleeve, and an output member extending from the gear wheel and coupled to the regulator for moving the window upward and downward.

13. The system as recited in claim 12 wherein the sensor comprises a piezoelectric layer mounted on the rotor shaft so that it is sandwiched between the worm sleeve and the rotor shaft when the worm sleeve is inserted onto the rotor shaft, the piezoelectric layer sensing a pressure in response to a resistive torque being applied to the worm sleeve via the regulator.

14. The system as recited in claim 12 wherein the connection comprises a secondary commutator and a pair of secondary brushes mounted on the rotor shaft and coupled to the piezoelectric layer for transmitting the signal to the control circuit.

15. The system as recited in claim 14 wherein the connection further comprises a pair of secondary contacts coupled to the control circuit for contacting the pair of secondary brushes and receiving the signal.

16. The system as recited in claim 7, wherein said sensor being a torque sensor, and said sensor being positioned to sense a torque between said motor and a connection for driving said regulator through said motor.

17. The system as recited in claim 12, wherein the sensor comprises a layer mounted on the rotor shaft to be sandwiched between said worm sleeve and said rotor shaft when said worm sleeve is inserted onto said rotor shaft, said laser sensing a pressure in response to resistive torque being applied to said worm sleeve via the regulator.

18. A window system comprising:

an automotive window opening and closing via a regulator driven by an electric drive motor;

a sensor mounted on the drive motor for directly sensing a resistive torque applied to the regulator and generating a signal having a value indicative of the resistive torque;

a connection for transmitting the signal to a control;

a control circuit in communication with the connection and the drive motor for receiving the signal and determining whether or not an object is caught between the window and a frame based on the signal;

the drive motor includes a rotor shaft extending therefrom, a cylindrical worm sleeve encircling the rotor shaft, a gear wheel associated with the worm sleeve for rotating in response to rotation of the worm sleeve, and an output member extending from the gear wheel and coupled to the regulator for moving the window upward and downward; and the sensor comprises a piezoelectric layer mounted on the rotor shaft so that it is sandwiched between the worm sleeve and the rotor shaft when the worm sleeve is inserted onto the rotor shaft, the piezoelectric layer sensing a pressure in response to a resistive torque being applied to the worm sleeve via the regulator.

19. The system as recited in claim 18 wherein the rotor shaft has a hub portion with a planar face, the worm sleeve having a hub portion with a mating planar face, the piezoelectric layer mounted between the planar faces of the rotor shaft and worm sleeve.

20. The system as recited in claim 19 wherein the hub portions are each semi-circular portions.

* * * * *

UNITED STATES PATENT AND TRADEMARK OFFICE

CERTIFICATE OF CORRECTION

PATENT NO. : 6,452,351 B1 Page 1 of 1
DATED : September 17, 2002
INVENTOR(S) : Hopson et al.

It is certified that error appears in the above-identified patent and that said Letters Patent is hereby corrected as shown below:

Column 4,
Line 67, "laser" should be -- layer --.

Signed and Sealed this

Twenty-fourth Day of December, 2002

JAMES E. ROGAN
*Director of the United States Patent and Trademark Office*